May 12, 1925.  
F. P. CHURCH  
ELECTRICAL INSTRUMENT  
Filed July 27, 1921
1,537,407
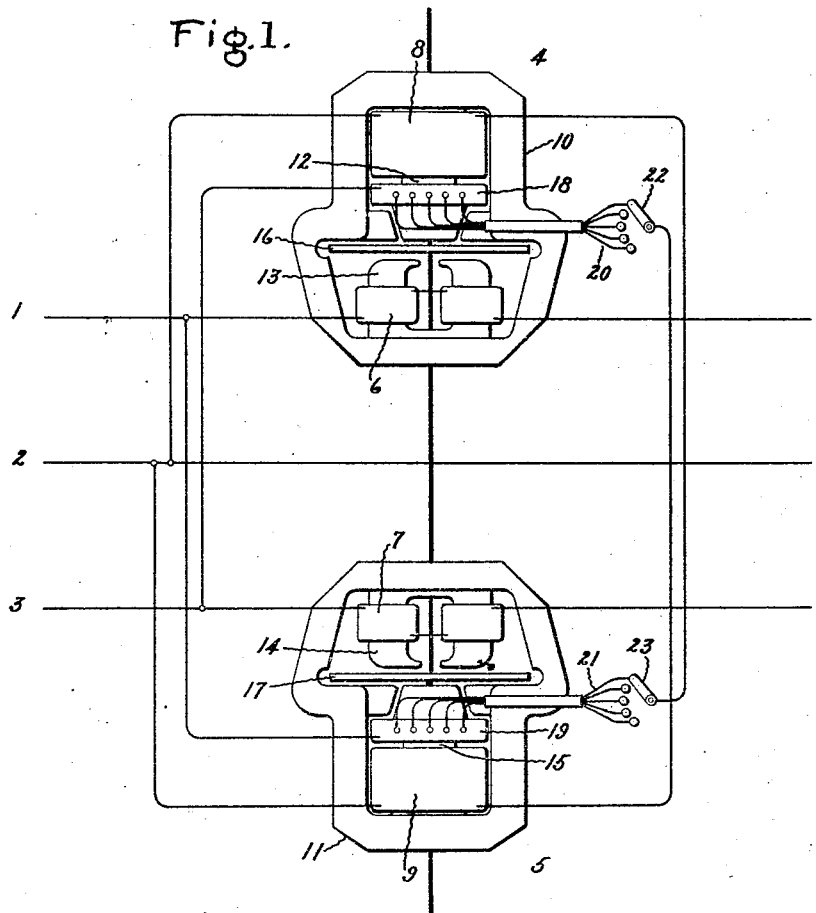
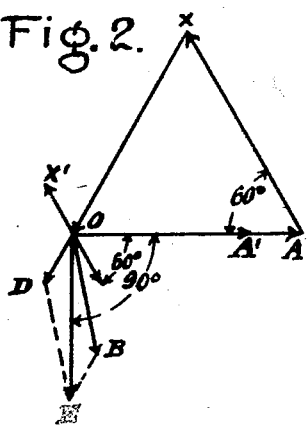
Inventor:  
Frederick P. Church,  
by *Albert G. Davis*  
His Attorney.

Patented May 12, 1925.

1,537,407

UNITED STATES PATENT OFFICE.

FREDERICK P. CHURCH, OF LYNN, MASSACHUSETTS, ASSIGNOR TO GENERAL ELECTRIC COMPANY, A CORPORATION OF NEW YORK.

ELECTRICAL INSTRUMENT.

Application filed July 27, 1921. Serial No. 488,041.

*To all whom it may concern:*

Be it known that I, FREDERICK P. CHURCH, a citizen of the United States, residing at Lynn, in the county of Essex, State of Massachusetts, have invented certain new and useful Improvements in Electrical Instruments, of which the following is a specification.

This invention relates to an electrical instrument, and more particularly to an induction type of instrument adapted to connection to an alternating current circuit.

Induction type of measuring instruments are being used to a considerable extent with good success for measuring alternating current power or energy. Their accuracy depends partly upon the maintenance of the proper phase relation between the fluxes which thread the rotating induction disc. Thus to make the meter register accurately, use is usually made of some form of lagging means so that that part of the core surrounded by the potential coil has a flux lagging 90° behind the electromotive force impressed upon the potential coil. If it were possible to design a potential coil with negligible resistance so that the power factor of the current through it would be zero and the load purely inductive, no additional lagging device would be necessary. However, since it is impossible to build a coil with an iron core, without any losses therein, due to its own resistance as well as the eddy current and hysteresis effects in the iron, a purely inductive current cannot be obtained. For obtaining the proper phase relation, use may be made of a short circuited conductor, which conductor surrounds the core of the potential coil. Such a scheme is shown for example in a patent granted to Wm. H. Pratt, Nov. 6, 1906, No. 835,321. In this patent the short circuited coil is marked L on Figure 4 of the drawing. By the use of such a short circuited conductor it is possible to obtain a flux through the core of the potential coil which lags exactly 90° behind the electromotive force, and to cause the meter to register accurately even though the losses in the potential circuit amount to a considerable value.

It may easily be demonstrated theoretically and checked experimentally that a lag plate or short circuited conductor which is adjusted to give the proper phase relation of the fluxes will operate properly only at one definite frequency. It is impossible for such a meter to indicate the power or energy consumption accurately on a system in which the frequency varies within comparatively wide limits; for example, where such a system is used as in ship propulsion where the frequency may vary from two cycles up to as much as sixty cycles.

My invention has for its object to produce a meter such that the phase relation of the fluxes in the core remains undisturbed and independent of wide and continuous frequency variation. It constitutes an improvement on the invention having the same object described in the application of Wm. H. Pratt, Serial No. 488,046, filed concurrently herewith and assigned to the same assignee as the present application. In the Pratt application a scheme is described utilizing auxiliary current coils. During the construction of the meter it is necessary to adjust the effect of the auxiliary coils. Since Pratt utilizes current coils, this adjustment is most practicably made by a variation in the number of turns. This number being limited, it is not susceptible of very close adjustment. In my invention I utilize auxiliary potential coils placed in series with the main potential coils of another phase. These auxiliary coils may be easily adjusted to give the proper effect since a comparatively large number of turns is used thereon. I place the auxiliary potential coils on the same limb of the core of the induction meter as that which carries the main potential coil and its effect to shift the phase of the flux which threads this part of the core may be easily regulated by means of a switching arrangement.

The operating characteristics of this form of meter are essentially similar to those described in the Pratt application referred to hereinbefore. It is possible to operate the meter either as an indicating or integrating meter on circuits subjected to wide and continuous fluctuations of frequency with a high degree of accuracy.

For a better understanding of my invention, reference is to be had to the accompanying drawings in which Fig. 1 is a wiring diagram showing how the various coils of the instrument are connected and Fig. 2 is a vector diagram explanatory of the meter fluxes.

Referring now more in detail to Fig. 1, I show in this instance a three-phase system having the three mains 1, 2 and 3. The ordinary scheme for the measurement of three-phase power is used; that is, two metering elements 4 and 5 are so connected that their current coils 6 and 7 are in the outside leads 1 and 3, while the main potential coils 8 and 9 are responsive to the electromotive forces between the outside lines and the inside line. The core parts 10 and 11 have limbs 12, 13, 14 and 15 upon which the various coils are disposed in the usual manner. Placed within the influence of the fluxes set up are the rotating members 16, 17 of conducting material so arranged that they may affect a pointer or a register, depending upon whether the instrument is used as an indicating instrument or as an integrating instrument.

The metering element 4 has in addition an auxiliary potential coil 18 and the metering element 5 has a corresponding auxiliary potential coil 19. Both of these coils are arranged to have an adjustable effect upon the flux threading the limbs 12 and 15 by means of a variation of the number of active turns in these coils. This may be effected by means of the taps 20 and 21 with which cooperate switches 22 and 23 in a well understood manner. The auxiliary coil 18 is energized in accordance with the electromotive force across the phase which serves to energize the main potential coil 9. The same statement may be made with respect to the energization of auxiliary coil 19 and main potential coil 8. It is necessary, however, to make the flux produced by the auxiliary coils adjustable. If placed directly across the mains, this flux would be substantially independent of the number of turns. To enable adjusting, the auxiliary potential coil 18 is placed in series relation with the main potential coil 9 across the mains 2 and 3. In a similar way the auxiliary coil 19 and the main coil 8 are placed in series relation across the mains 1 and 2. Thus coil 8 is energized in accordance with the electromotive force across the mains 1 and 2, while its auxiliary coil 18 is energized in accordance with the electromotive force across mains 2 and 3. By properly adjusting the number of turns in the auxiliary coil 18 it is possible to make the flux which threads the limb 12 lag exactly 90° behind the electromotive force across phases 1 and 2. This adjustment of the phase relation is substantially independent of the frequency of the system, since it is determined almost entirely by the phase relation of the electromotive force across the various mains. This phase relation in a balanced system remains the same throughout the frequency range.

In Fig. 2 let the equilateral triangle OAX represent the E. M. F. vector of the three phase line and OA' the E. M. F. vector impressed upon the main potential coil 8, Fig. 1. The E. M. F. impressed upon the auxiliary potential coil 18 is a portion of the potential AX and is represented by the vector OX'; but by reversing this coil the E. M. F. vector of coil 18 is represented by the vector OC. The flux, due to the potential coil 8, may be represented by vectors OB and the flux, due to the potential coil 18, may be represented by the vector OD and the resultant flux of the two potential coils is, therefore, represented by the vector OE which lags the desired 90 degrees behind the main potential vector OA'. It will be evident that the impedance of the potential circuits is almost entirely due to the reactance of said circuits so that a change in frequency will have little effect upon the phase relation between the E. M. F. vectors and their respective flux vectors and consequently the 90 degree phase relation between vectors OA' and the resultant flux vectors OE will be substantially independent of frequency variations over a wider range than can be obtained by the ordinary method.

By the aid of my invention it is possible to make an accurate adjustment of the phase relation of the fluxes. This adjustment is made by manual manipulation of the switches 22 and 23 before the meter is installed.

While I have shown in the accompanying drawing but one embodiment of my invention, I do not wish to be limited thereto but aim to embrace in the appended claims all modifications falling fairly within the spirit and scope of my invention.

What I claim as new and desire to secure by Letters Patent of the United States, is:—

1. A polyphase induction instrument for three-phase circuits comprising two single phase wattmeter elements with their movable members mechanically connected together, each element having a current coil, a main potential coil and an auxiliary potential coil, and circuit connections for connecting each main potential coil in series with the auxiliary potential coil of the other element.

2. A polyphase induction instrument for three-phase circuits comprising two single phase wattmeter elements with their movable members mechanically connected together, each element having a current coil, a main potential coil and an auxiliary potential coil, circuit connections for connecting each main potential coil in series with the auxiliary potential coil of the other element, and means for adjusting the relative number of ampere turns in the potential coils which are connected in series.

3. A polyphase induction instrument adapted to be connected to an alternating current circuit of variable frequency comprising a plurality of core members, a potential coil and a current coil on each member, an auxiliary potential coil in series with each main potential coil, each set of potential coils being arranged to be connected to different phases, and the auxiliary coil of each set being disposed on that core which supports the main potential coil of another set, and a rotatable element arranged to be influenced by the fluxes set up in the core members.

4. The combination as set forth in claim 3, with means for varying the number of active turns of the auxiliary coils.

In witness whereof, I have hereunto set my hand this 19th day of July, 1921.

FREDERICK P. CHURCH.